US009397990B1

(12) United States Patent
Taly et al.

(10) Patent No.: US 9,397,990 B1
(45) Date of Patent: Jul. 19, 2016

(54) METHODS AND SYSTEMS OF GENERATING AND USING AUTHENTICATION CREDENTIALS FOR DECENTRALIZED AUTHORIZATION IN THE CLOUD

(71) Applicant: Google Inc., Mountain View, CA (US)

(72) Inventors: Ankur Taly, Mountain View, CA (US); Ulfar Erlingsson, Mountain View, CA (US); Arnar Birgisson, Gothenburg (SE); Joseph Gibbs Politz, Providence, RI (US); Mark Lentczner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 14/074,941

(22) Filed: Nov. 8, 2013

(51) Int. Cl.
*G06F 21/00* (2013.01)
*H04L 29/06* (2006.01)

(52) U.S. Cl.
CPC ................ *H04L 63/08* (2013.01); *H04L 63/10* (2013.01)

(58) Field of Classification Search
CPC ......... H04L 63/08; H04L 63/10; H04L 63/12; H04L 9/321
See application file for complete search history.

(56) References Cited

U.S. PATENT DOCUMENTS

| 6,279,111 | B1 * | 8/2001 | Jensenworth et al. .......... 726/10 |
| 6,367,009 | B1 | 4/2002 | Davis et al. |
| 6,678,828 | B1 * | 1/2004 | Pham et al. ........................ 726/2 |
| 8,042,163 | B1 * | 10/2011 | Karr et al. .......................... 726/9 |
| 8,418,222 | B2 | 4/2013 | Gbadegesin et al. |
| 8,533,796 | B1 * | 9/2013 | Shenoy et al. .................... 726/6 |
| 8,752,203 | B2 * | 6/2014 | Reinertsen ...................... 726/28 |
| 8,793,509 | B1 * | 7/2014 | Nelson et al. ................. 713/193 |
| 8,856,887 | B2 * | 10/2014 | Field-Eliot .......... H04L 63/0807 713/172 |
| 8,898,766 | B2 * | 11/2014 | Garmark et al. ................... 726/9 |
| 2002/0069174 | A1 | 6/2002 | Fox et al. |
| 2003/0028585 | A1 | 2/2003 | Yeager et al. |
| 2003/0055894 | A1 | 3/2003 | Yeager et al. |
| 2003/0055898 | A1 | 3/2003 | Yeager et al. |
| 2003/0070070 | A1 | 4/2003 | Yeager et al. |
| 2003/0097573 | A1 * | 5/2003 | Wheeler ............ G06Q 20/4014 713/182 |
| 2004/0068757 | A1 | 4/2004 | Heredia |
| 2004/0083359 | A1 | 4/2004 | Camus et al. |

(Continued)

OTHER PUBLICATIONS

E. Hammar-Lahav, ed., the OAuth 1.0 Protocol, Internet Engineering Task Force Issn: 2070-1721 (Apr. 2010).*

(Continued)

*Primary Examiner* — Taghi Arani
*Assistant Examiner* — Sharon Lynch
(74) *Attorney, Agent, or Firm* — Fox Rothschild LLP

(57) ABSTRACT

A method of controlling the sharing of data between entities that are in electronic communication with each other may include generating an authentication credential comprising an identifier for the target service and a unique signature, attenuating the authentication credential, and determining whether a client device is authorized to access the target service, and, only if so, providing the authentication credential to the client device. In an embodiment, the method may include receiving an access request from the client device, identifying that the authentication credential includes the unique signature and a third party caveat that is associated with a third party authentication service, in response to the identifying, determining whether the request also comprises a discharge credential for the third party caveat, and if the request includes the discharge credential, providing the client device with the requested service, otherwise denying the request.

27 Claims, 7 Drawing Sheets

(56) References Cited

U.S. PATENT DOCUMENTS

| | | | |
|---|---|---|---|
| 2004/0088347 A1 | 5/2004 | Yeager et al. | |
| 2004/0088348 A1 | 5/2004 | Yeager et al. | |
| 2004/0088369 A1 | 5/2004 | Yeager et al. | |
| 2004/0088646 A1 | 5/2004 | Yeager et al. | |
| 2004/0133640 A1 | 7/2004 | Yeager et al. | |
| 2005/0021969 A1 | 1/2005 | Williams et al. | |
| 2005/0086300 A1 | 4/2005 | Yeager et al. | |
| 2009/0064342 A1 | 3/2009 | Chan et al. | |
| 2009/0254978 A1* | 10/2009 | Rouskov et al. | 726/4 |
| 2009/0271847 A1* | 10/2009 | Karjala et al. | 726/6 |
| 2010/0199089 A1* | 8/2010 | Vysogorets | G06F 21/34 713/168 |
| 2010/0212004 A1* | 8/2010 | Fu | 726/9 |
| 2010/0293385 A1* | 11/2010 | Nanda et al. | 713/176 |
| 2011/0225643 A1* | 9/2011 | Faynberg et al. | 726/10 |
| 2011/0265172 A1* | 10/2011 | Sharma et al. | 726/8 |
| 2012/0102566 A1* | 4/2012 | Vrancken et al. | 726/20 |
| 2012/0204221 A1* | 8/2012 | Monjas Llorente et al. | 726/1 |
| 2012/0210448 A1* | 8/2012 | Vrancken et al. | 726/29 |
| 2012/0233705 A1* | 9/2012 | Boysen | G06F 21/335 726/29 |
| 2012/0317655 A1 | 12/2012 | Zhang et al. | |
| 2013/0007845 A1 | 1/2013 | Chang et al. | |
| 2013/0019299 A1 | 1/2013 | Vepsalainen et al. | |
| 2013/0036455 A1* | 2/2013 | Bodi et al. | 726/4 |
| 2013/0086645 A1* | 4/2013 | Srinivasan et al. | 726/4 |
| 2013/0145435 A1* | 6/2013 | Fu | 726/4 |
| 2013/0191884 A1* | 7/2013 | Leicher et al. | 726/4 |
| 2014/0013110 A1* | 1/2014 | Thoniel | H04L 9/083 713/156 |
| 2014/0020064 A1* | 1/2014 | Hildebrand | 726/4 |
| 2014/0026193 A1* | 1/2014 | Saxman et al. | 726/4 |
| 2014/0040987 A1* | 2/2014 | Haugsnes | 726/3 |
| 2014/0047513 A1 | 2/2014 | van 't Noordende | |
| 2014/0101722 A1* | 4/2014 | Moore | 726/4 |
| 2014/0208119 A1* | 7/2014 | Chang et al. | 713/176 |
| 2014/0245417 A1* | 8/2014 | Hu et al. | 726/7 |
| 2014/0279556 A1* | 9/2014 | Priebatsch et al. | 705/67 |
| 2014/0282881 A1* | 9/2014 | Li et al. | 726/4 |
| 2014/0337955 A1* | 11/2014 | Mendelovich et al. | 726/9 |
| 2015/0089569 A1* | 3/2015 | Sondhi et al. | 726/1 |

OTHER PUBLICATIONS

Tanenbaum et al., "The Amoeba Distributed Operating System—A Status Report", Dept. of Mathematics and Computer Science, Vrije Universiteit, Amsterdam, The Netherlands, pp. 1-22.

Howard Gobioff, "Security for a High Performance Commodity Storage Subsystem", Jul. 1999.

Aguilera et al., "Block-Level Security for Network-Attached Disks".

Mittra et al., "A Flow-Based Approach to Datagram Security".

Reed et al., "Authenticating Network Attached Storage", Jun. 6, 2003.

* cited by examiner

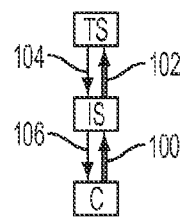
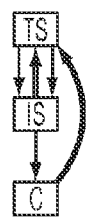
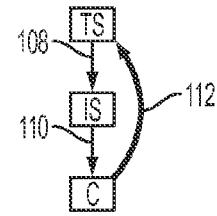
FIG. 1A  FIG. 1B  FIG. 1C
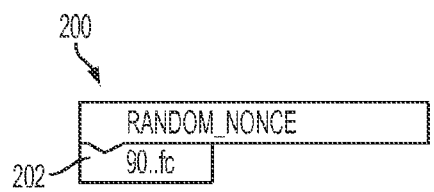
FIG. 2
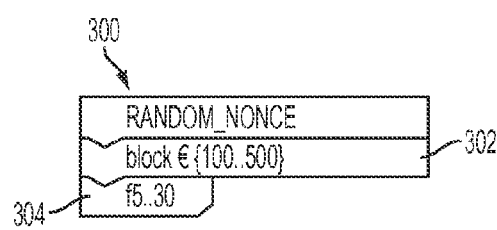
FIG. 3
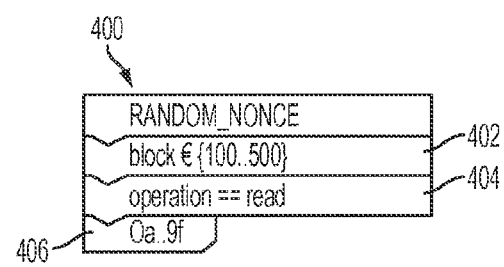
FIG. 4

```
CreateMacaroon(k,id,L)
    sig := MAC (k, id)
    return macaroon@L(id, [],sig)

M.addCaveatHelper(cId, tId,cL)
    macaroon@L(id, C,sig) ← M        // ← is pattern matching
    C := cav@cL(cId,tId)
    sig´ := MAC(sig,cId :: tId)      // :: is pair concatenation
    return macaroon@L(id, C▸C, sig´) //▸is list append M.AddThirdPartyCaveat(cK,cLd,cL)
    tId := Enc(M.sig,cK)
    return M.addCaveatHelper(cId,tId,cL)

M.AddFirstPartyCaveat(a)
    return M.addCaveatHelper(a, 0, T)

M.PrepareForRequest(M)
    Msealed := ∅
    for M´ ∈ M
        macaroon@L´(id´, C´, sig´) ← M´
        sig´´ := M.bindForRequest(sig´)
        Msealed := Msealed ∪ {macaroon@L´(id´, C´, sig´´)}
    return Msealed M.Verify(TM, k, A, M)
    cSig := MAC (k,M.id)
    for i := 0 to |C|-1
        cav@L(cId,tId) ← C[i]
        cK := Dec(cSig,tId)
        if (tId = 0)
            assert (∃a ∈ A: a = cId)
        else
            assert (∃M´ ∈ M: M´.id = cId
                           ∧ M´.Verify(TM,cK,A,M))
    cSig: = MAC(cSig,cId :: tId)
    assert (M.sig = TM.bindForRequest(cSig))
    return true
```

FIG. 7

METHODS AND SYSTEMS OF GENERATING AND USING AUTHENTICATION CREDENTIALS FOR DECENTRALIZED AUTHORIZATION IN THE CLOUD

BACKGROUND

Controlled sharing of objects is fundamental to distributed systems. However, only limited and simple means of sharing are supported in network or cloud-based systems. Current software systems are often constructed as a decentralized graph of collaborative, loosely-coupled services that include different protection domains, communication channels, execution environments and implementations.

As such, security and access control are of concern. Instead of using public-key based certificates or other sophisticated key agreement, cloud-based services typically use a pattern of pure bearer tokens or authentication credentials. Bearer tokens or credentials that grant unconditional authority are often sent directly between clients, servers and protection domains, even on unencrypted channels.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. As used herein, the term "comprising" means "including, but not limited to."

In an embodiment, a method of controlling the sharing of data between entities that are in electronic communication with each other may include generating, by a target service, an authentication credential comprising an identifier for the target service and a unique signature. The method may include, by an intermediate service, attenuating the authentication credential, and determining whether a client device is authorized to access the target service, and, only if so, providing the authentication credential to the client device. In an embodiment, the method may include, by the target service, receiving an access request from the client device, where the request comprises the authentication credential and one or more parameters that relate to a requested service that is available from the target service, identifying that the authentication credential includes the unique signature and a third party caveat that is associated with a third party authentication service, in response to the identifying, determining whether the request also comprises a discharge credential for the third party caveat, and if the request includes the discharge credential, providing the client device with the requested service, otherwise denying the request.

In an embodiment, a method of controlling the sharing of data between entities that are in electronic communication with each other may include generating, by a target service, a first authentication credential comprising an identifier for the target service, and a unique signature. The method may include, by an intermediate service, attenuating the first authentication credential, and determining whether a client device is authorized to access the target service, and only if so providing the first authentication credential to the authorized client. The method may include, by the target service, receiving an access request from the client, where the request includes the first authentication credential, one or more parameters that relate to a requested service that is available from the target service, and a plurality of disjunctive authentication credentials, identifying that one or more of the received credentials includes the unique signature and a third party caveat that is associated with a third party authentication service, in response to the identifying, determining whether the request also comprises a discharge credential for at least one of the third party caveats, and if the request includes a discharge credential for at least one of the third party caveats, providing the client device with the requested service, otherwise denying the request.

Any or all of the steps described above may be implemented by a system that includes a target service computing device, target service programming instructions, an intermediate service computing device and intermediate service programming instructions. The target service programming instructions, when executed, may cause the target service computing device to implement any or all of the steps described above. The intermediate service programming instructions, when executed, may cause the intermediate service computing device to implement any or all of the steps described above.

In an embodiment, a method of controlling the sharing of data between entities that are in electronic communication with each other may include, by a client device processor, receiving an authentication credential comprising an identifier for a target service and a caveat that is associated with a third party authentication service, storing the authentication credential in a non-transitory, computer-readable memory, identifying that the authentication credential includes the caveat, providing the authentication credential to the third party authentication service, receiving, from the third party authentication service, a discharge credential, and after the client device has received the discharge credential, providing the target service with a service request, where the service request comprises the authentication credential and the discharge credential.

Any or all of the steps described above may be implemented by a system that includes a computing device and a non-transitory, computer-readable storage medium in communication with the computing device. The computer-readable storage medium may contain one or more programming instructions that, when executed, cause the computing device to implement any or all of the steps identified above.

BRIEF DESCRIPTION OF THE DRAWINGS

FIGS. 1A-1C illustrate example ways that an intermediate service may provide a client with limited access to a targeted service according to an embodiment.

FIGS. 2-4 illustrate an example authentication credential construction according to various embodiments.

FIG. 7 illustrates example pseudocode operations that may be performed to create and extend an authentication credential, prepare an authentication credential for use in a request and/or verify an authentication credential at a target service according to an embodiment.

DETAILED DESCRIPTION

Figure 5:
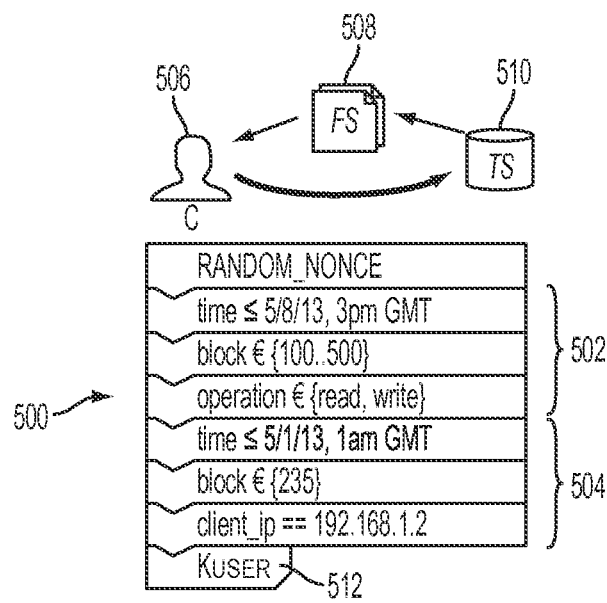
FIGS. 5 and 6 illustrate example authentication credentials according to various embodiments.

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

An "authentication credential" refers to an object or data structure that is used to authenticate the identity of a person or entity. An authentication credential may be used to confirm the integrity of certain attribute values. In an embodiment, an authentication credential may be incorporated into a token.

A "caveat" refers to a predicate that is to hold true for the context of any requests that a macaroon is to authorize at a target service.

A "discharge credential" refers to an object or data structure that confirms whether one or more third-party caveats of an authentication credential have been satisfied or discharged.

This document may use the term "macaroon" to refer to an authorization credential that provides flexible support for controlled sharing in decentralized, distributed systems.

In an embodiment, a macaroon may be service-centric. A target service resource, such as a cloud-based server, may mint a macaroon that grants authority to access some aspects of the service. The bearer of a macaroon may delegate parts of its authority to other principals by deriving new macaroons that attenuate the accessible aspects of the target service and place restrictions on the macaroon's use. For example, a macaroon may restrict from where, by whom, and with what evidence the macaroon may be used.

In an embodiment, a macaroon may include one or more caveats. A caveat may state a predicate that must hold true for the context of any requests that the macaroon is to authorize at the target service. In an embodiment, a target service may evaluate one or more predicates in the context of one or more requests.

FIGS. 1A-1C illustrate example ways that an intermediate service (IS) may provide a client (C) with access to a targeted service (TS). As illustrated by FIG. 1A, the first way may be through the use of proxy restrictions. TS may send 100 an authorization credential to IS which, in turn, may send 102 the credential to C. C may send 104 an access request to IS which, in turn, may send 106 an access request to TS. In an embodiment, a TS and an IS may be the same service.

As illustrated by FIG. 1B, IS may provide C with access to a TS using re-minted restrictions. FIG. 1C illustrates a way of providing C with access to TS using macaroons. As illustrated by FIG. 1C, TS may send 108 a macaroon to IS which, in turn, may send 110 the macaroon to C. C may use the macaroon to send 112 an access request to TS.

As illustrated by FIG. 1, a macaroon enables the derivation and use of new, more restricted authorization credentials without proxying upon requests to the target service, or retrieving new credentials from the target service. As such, macaroons may help avoid the latency and throughput inefficiencies, loss of transparency, and trust requirements imposed by the proxying and credential re-minting patterns commonly used in a distributed network.

In an embodiment, a macaroon may include one or more first-party caveats. A first-party caveat may be a caveat that may be validated by a target service. A first-party caveat may confine the context observed at the target service when the macaroon is used. Because requests may be sent directly from client to a target service, the target service may only need to check the predicates in first-party caveats against the context of incoming requests. For example, a request may include a macaroon having a first-party caveat indicating that only a request from a certain IP address should be granted. The target service may verify that that the request is made from the specified IP address before granting the request. Additional and/or alternate examples may be used within the scope of this disclosure.

In an embodiment, a macaroon may include one or more third-party caveats. A third-party caveat may require any number of holder-of-key proofs to be presented with authorized requests. For example, macaroons may use caveats for a third-party revocation-checking service, and require that authorized requests present fresh proofs discharging those caveats. Third-party caveats may help require that each request authorized by a macaroon be subject to one or more extra steps for authentication, authorization and/or audit purposes. For example, a third-party caveat may require a check of network time, authentication at identity providers, auditing and provenance tracking at document repositories, scanning by anti-virus engines, vetting by a denial-of-service prevention and risk-analysis service and/or the like.

Macaroons and their caveats make one or more assertions about conditional access to a target service. In an embodiment, a macaroon and its caveats may be interpreted as follows: "The bearer may perform a request as long as predicates $C_1, \ldots, C_n$ hold true in the context of this request." For example, if the owner of a private image at a target service, TS, wants to safely email its URL link to the members of a group, G, kept at an unrelated service, A, the assertion may be as follows:

The bearer, client C, may perform the request at TS
    as long as the operation is read,
    as long as the object is privateImage.jpg,
    as long as the requesting user at C is logged into service A,
    as long as that logged-in user is in group G at A,
    as long as the above proofs are recent enough, and
    as long as the user at C hasn't logged out of A.

In an embodiment, a macaroon may be constructed from one or more messages and a chain of keyed cryptographic digests that are derived from those messages. The chain of digest vales may be computed using hash message authentication code (HMAC) functions. In an embodiment, a macaroon may include only the terminal or final HMAC value in the chain. The final HMAC value may be used as the macaroon's signature. The signature may allow a target service to verify the integrity of the macaroon and may allow shared keys to be established with the bearers of any derived macaroons.

In an embodiment, a first message in a macaroon may be a public, opaque key identifier that maps to the macaroon's secret root key. The root key may be known only to the target service. In an embodiment, a key identifier may be implemented using random nonces, indices into a database at the target service, keyed HMACs, public-key encryption, secret-key encryption and/or the like.

In an embodiment, a macaroon's chain of HMAC values may be derived by computing, for each message, a keyed HMAC value, nested so that each such value is used as the HMAC key for the next message in the macaroon. As such, a macaroon with two messages, MsgId and MsgCav, and root key $K_R$ would have the signature MAC($K_{tmp}$, MsgCav), where $K_{tmp}$ is MAC ($K_R$, MsgId).

FIGS. 2-4 illustrate an example macaroon construction according to various embodiments. FIG. 2 illustrates a macaroon 200 with a random nonce key identifier and a secret key $K_{TS}$ that is held at a target service according to an embodiment. The macaroon illustrated in FIG. 2 may grant bearers access to a block-storage service. The signature 202 of the macaroon 200 may represent HMAC ($K_{TS}$, RANDOM_NONCE).

FIG. 3 illustrates a macaroon 300 that may be derived from the macaroon illustrated in FIG. 2 according to an embodiment. In an embodiment, access afforded by a macaroon may be attenuated by adding one or more caveats with a predicate. For example, as illustrated by FIG. 3, the macaroon 300 may be attenuated with a caveat 302 having a predicate that restricts the block numbers that may be accessed. The macaroon 300 illustrated in FIG. 3 includes a predicate 302 that only permits access requests for blocks ranging from 100 to 500. In an embodiment, the signature 304 of the macaroon may represent HMAC (90 . . . fc, "block c{100, . . . 500}").

The macaroon 400 illustrated in FIG. 4 includes predicates 402, 404 that only permit read access for blocks 100 to 500. In an embodiment, the signature 406 of the macaroon may represent HMAC (f5 . . . 30, "operation=read").

In an embodiment, to verify the integrity of a macaroon, a target service may check its signature against the macaroon's HMAC values, which may be derived using the macaroon's root key value. For example, to verify the integrity of the macaroon illustrated in FIG. 4, a target service may verify its signature against its HMAC values 0a . . . 9f.

In an embodiment, the construction of a macaroon may make delegation or attenuation of authority associated with the macaroon easier because the HMAC signature chain may establish shared keys with the target service and between the bearers of successive, derived macaroons.

FIG. 5 illustrates an example macaroon 500 according to an embodiment. The macaroon 500 illustrated in FIG. 5 may authorize a user at a client C 506 to access block 235 on a networked disk. In an embodiment, this macaroon may have been derived as an attenuation of another more permissive macaroon, such as a macaroon held by a file system, FS 508, by embedding that macaroon's signature and by adding caveats whose predicates limit the block number and client IP address permitted in requests. For example, the macaroon illustrated in FIG. 5 shows the caveats 502 that were embedded by a target service, TS 510, and the caveats 504 that were embedded by FS. In an embodiment, the macaroon's signature, $K_{USER}$ 512, may allow the target disk to verify the macaroon's integrity and may allow its bearer to derive new, further attenuated macaroons.

In an embodiment, a third-party caveat of a macaroon may state a requirement for a holder-of-key proof that asserts one or more predicates. These proof requirements may be embedded into a macaroon, and its chain of HMAC values, in a matter that allows the appropriate parties to create proofs asserting those predicates, allows those proofs to embed additional caveats, either for themselves or other third parties, and allows the target service to verify that all the proofs required by a macaroon have been discharged.

Figure 6:
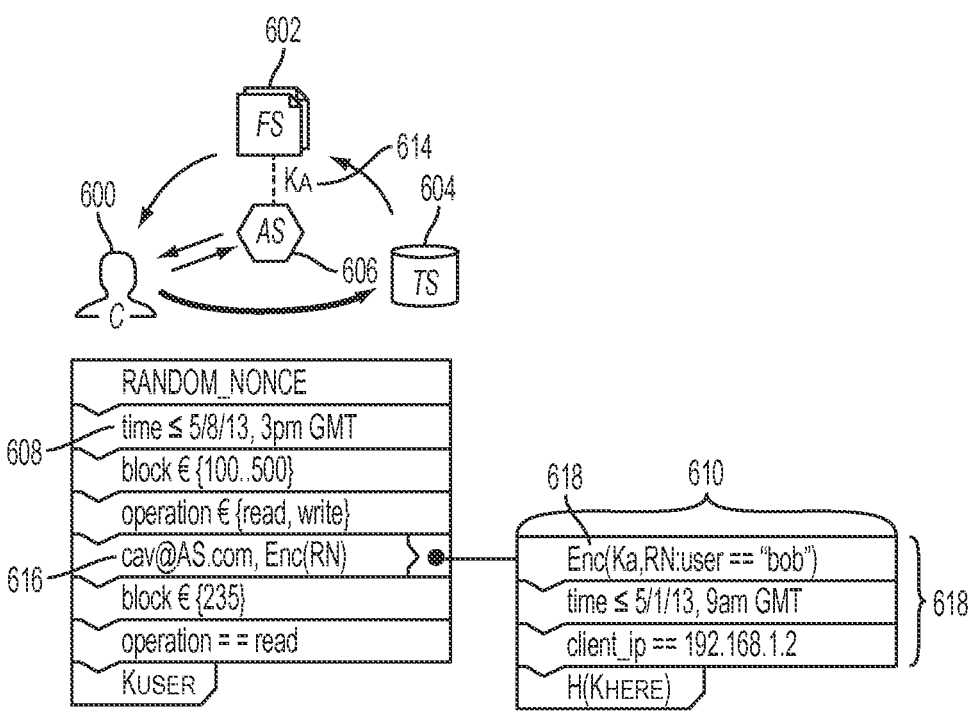

FIG. 6 illustrates an example macaroon 608 according to an embodiment. FIG. 6 also illustrates a proof 610 that discharges the macaroon's third-party caveats, which is itself a macaroon whose key identifier encodes both the root key for deriving holder-of-key proofs and the predicates to be checked by the third party. The two macaroons 608, 610 illustrated by FIG. 6 may together give client C 600 limited-time read access to block 235 at the TS 604. In an embodiment, using its macaroon from TS 604, the file system FS 602 may derive for C 600 a macaroon 608 that embeds a third-party caveat for an authentication service AS 606, confining access to clients C where a user "bob" is logged into AS. This caveat may include an encrypted root key and a key identifier. Using the key identifier, AS 606 may derive for C 600 a macaroon 610 that asserts, for only a limited time, and for only one IP address, that AS has verified client C's user.

In an embodiment, the key identifier may be thought of as a message encrypted with a public key for the third party. For example, in FIG. 6, the random key RN 612 and the predicate user="bob" may be encrypted using the key KA 614 for AS. The key identifier may be included in the message that a macaroon embeds for a third-party predicate along with a hint to the location of the caveat-discharging service. For example, in FIG. 6, the hint 616 is @AS.com. In an embodiment, the message may also contain another encrypted copy of the root key to derive proof macaroons using the signature of the macaroon onto which the caveat is added as the encryption key. For example, in FIG. 6, the encrypted root key is depicted as Enc(RN) 618.

In an embodiment, to authorize a request, a target service may need to verify an entire set of macaroons presented with that request. The target service may need to verify that the caveat discharge macaroons can be found for all third-party caveats and that all first-party caveat predicates hold true in the context of the request. In an embodiment, a target service may perform this verification by inducing a tree from the set of presented macaroons and checking their signatures against the chain of HMAC values derived along each branch from the root to leaves. The messages in the third-party caveats may allow the target service to match the key identifiers of caveat discharging macaroons and decrypt their root keys.

As illustrated by FIG. 6, from its existing macaroon 608 for the service TS 604, the FS 602 may derive a macaroon 610 for user "bob" that attenuates what aspects of TS 604 are accessible. FS 602 may delegate the authentication of users to a third-party service AS 606, using the key $K_A$ 614 it holds for AS. The AS 606 service may evaluate the requesting client C before returning a macaroon that discharges the user="bob" caveat. However, AS 606 may add one or more additional caveats 618 to the returned macaroon. The one or more added caveats 618 may include first-party caveats and/or third party caveats that restrict the context of where, when and to whom, the macaroon credential should grant any authority. Notably, using macaroons, all of the above can be accomplished without the target service TS 604 having any direct relationship with AS 606, and without TS knowing that the request from C 600 is on behalf of a user "bob".

In an embodiment, the domain values of a macaroon may include Keys for all cryptographic keys, Locs for the locations of all services, and BitStrs for all bit-string values. Keys and locations may all be bit-strings; thus Keys ∪Locs ⊆BitStrs. Macaroons may be based on a secure, keyed cryptographic hash function MAC, and its output message authentication codes, as well as secure encryption and decryption functions Enc and Dec, with the following signatures:

MAC: Keys x BitStrs→Keys

Enc: Keys x BitStrs→BitStrs

Dec: Keys x BitStrs→BitStrs

In an embodiment, these functions may be recognized by all parties that are using macaroons. It may be assumed that each key output by a MAC operation can be used as a valid key for another MAC operation, or for symmetric-key-based Enc and Dec operations. As such, the nested chained-MAC for a list of bit-strings $[b_1, \ldots, b_n]$, under a key k, may be defined as MAC ( . . . MAC(MAC(k, $_{b1}$),$_{b2}$) . . . , $_{bn}$), where MAC(k, $_{b1}$) is used as the key for computing the MAC of $_{b2}$, which in turn is used as the key for computing the MAC of $_{b3}$, and so on.

In an embodiment, principals may each be associated with a location, a set of keys and macaroons, and the ability to manage secrets. The universe of all principals may be denoted as Prncs. For each secret they hold, principals may be assumed to be able to construct a public key identifier that confidentially and appropriately conveys this secret. In an embodiment, key identifiers may provide a means of authentication via holder-of-key proofs: a principal P may be presented with a key identifier and asked to prove knowledge of the secret, or some derivative of the secret.

In an embodiment, a macaroon may be associated with a root key that may be minted by a target service. A macaroon may include a key identifier associated with a target service, followed by a list of one or more caveats, and a macaroon signature that may be computed using the root key. The key identifier, also referred to as a macaroon identifier in this disclosure, may confidentially convey the root key and optionally a list of predicates to the target service. The macaroon signature may be a chained-MAC of the identifier and caveats, in sequence, under the root key.

In an embodiment, first-party and/or third-party caveats may be associated with two identifiers: a caveat identifier intended for the caveat's discharging principal, and a caveat-key identifier intended for the embedding macaroon's target. The embedding macaroon's signature may ensure the integrity of both identifiers.

For third-party caveats, the caveat identifier may encode within it one or more predicates and a root key, which may be referred to as a caveat root key. The caveat-key identifier may encode within it this same root key, encrypted using the current signature from the embedding macaroon. The target service may decrypt this identifier to obtain the root key. For first-party caveats the caveat identifier may simply be the authorization predicate and 0 may be used as the caveat-key identifier. Caveats may also have an optional location, not covered by the signature of the embedding macaroon, which provides a hint for where the principal that can discharge a caveat may be contacted.

In an embodiment, a target service may consider a macaroon's third-party caveat to be discharged if it locates a caveat discharge macaroon associated with the third-party caveat. A caveat discharge macaroon may include the associated caveat identifier and may have a chained-MAC signature that is correctly constructed using the caveat root key that the target service decodes from the caveat-key identifier. Such a caveat discharge macaroon may include one or more other third-party caveats, for which the target service may recursively seek discharges. In comparison, a first-party caveat may be discharged by checking that its authorization predicate has been evaluated and holds true in the context of the request.

In an embodiment, a macaroon, M, may be represented as a tuple in the following form:

macaroon$_{@L}$<id, C, sig> where

L∈Locs (optional) is a hint to the target's location, id∈BitStrs is the macaroon identifier.

C is a list of caveats of the form cav$_{@cL}$ (cId, tId), where cL∈Locs (optional) is a hint to a discharge location, cId∈BitStrs is the caveat identifier, tId∈BitStrs is the caveat-key identifier, sig∈Keys is a chained-MAC signature over the macaroon identifier id, and the each of the caveats in C, in sequence.

FIG. 7 illustrates example pseudocode operations that may be performed to create and extend a macaroon, prepare a macaroon for use in a request and/or verify a macaroon at a target service according to an embodiment. For macaroon, M, M.id, M.cavs and M.sig refer to the macaroon's identifier, list of caveats and signature, respectively.

Referring to FIG. 7, the function CreateMacaroon (k, id) may take a root key k and an identifier, id, as inputs and may return a macaroon having the identifier id, an empty caveat list and a signature computed as the HMAC of id under key k.

In an embodiment, one or more third-party and first-party caveats may be added to a macaroon, M, using the functions M.AddThirdPartyCaveat and M.AddFirstPartyCaveat respectively. M.AddThirdPartyCaveat may take as input a caveat root key cK, a caveat identifier cId, and a location cL of the caveat's discharging principal. The function may compute an identifier tId by encrypting the key cK with the macaroon signature of M as the encryption key. Using the function M.addCaveatHelper, it may add the caveat cavocL(cId, tId) to the caveat list of M, and update the signature to the MAC of the pair cId::tId, using the existing signature as the MAC key. In an embodiment, the M.AddFirstPartyCaveat operation may takes as input an authorization predicate a, and may add it using the M.addCaveatHelper method, and the caveat cav$_{@T}$<a, 0> to the caveat list of M. Here, T may be a location constant that refers to the target service.

In an embodiment, to make an access request, a client may be required to provide an authorizing macaroon along with discharge macaroons for the various embedded third-party caveats. These discharge macaroons may be holder-of-key proofs that may be used to satisfy any macaroon with corresponding third-party caveats that use the same root key. In an embodiment, a discharge macaroon may be required to be bound to the authorizing macaroon before being sent along with a request to the target. This binding may be carried out by the method M.PrepareForRequest(M), as illustrated in FIG. 7, which may bind the authorizing macaroon M to each discharge macaroon M' in the list M by modifying their signature to M.bindForRequest(M'). In an embodiment, the signatures of the authorizing and discharging macaroons may be hashed so that M.bindForRequest(M')=H(M'.sig::M.sig).

In an embodiment, in order to verify an incoming access request that includes an authorizing macaroon TM and a set of discharge macaroons M, a target service may ensure that all first-party and third-party caveats embedded in either TM or any macaroon in M are satisfied. In an embodiment, the target service may generate a set A of all embedded first-party caveat predicates that hold true in the context of the request whose macaroon is to be verified. To authorize the request, the target service may invoke the method TM.Verify(TM, k, A, M) as illustrated by FIG. 7, where k is the root key of macaroon TM. The method may iterate over the list of caveats in TM and may check each of them. For each embedded first-party caveat cav$_{@T}$<a, 0>, it may check if the predicate a appears in A. For each embedded third-party caveat $cav_{@LC}$ ⟨cId, tId⟩ in TM, it may extract the root key cK from tId, and check if there exists a macaroon M'∈M such that (i)M' has cId as its macaroon identifier and (ii) M' can be recursively verified by invoking M'.Verify(TM, cK, A, M). In an embodiment, it may check that the signature of the current macaroon is the computed chained-MAC signature properly bound to the authorization macaroon TM.

The following discussion offers an example of a macaroon-based authorization flow for the example of FIG. 6. A target service TS 604 may want to delegate read/write access to blocks {100 ... 500} on its disk to a file system FS 602 that expires at 3 pm on May 1, 2013. FS 602 in turn wants to delegate read access to just block 235 to a user (principal U) such that the user must authenticate as "Bob" at an authentication service at AS.com (principal AS), with the access expiring at 5/1/13, 1 am. In an embodiment, TS 604 may mint a macaroon with appropriate contextual caveats and may hand it to FS 602. FS 602 may attenuate the macaroon with one or more caveats and may hand it to C 600. For each principal P and secret b, there may exist a public identifier, which is denoted here by ${\{b\}}_P$, that confidentially conveys the secret b to the principal P.

Minting a Macaroon at a Target Service

Referring to FIG. 6, TS 604 may construct a macaroon $M_{TS}$ 608 with three first-party caveats that, respectively, require the block request parameter to be in the range {100 ... 500}, the operation request parameter to be in the set {read, write}, and the time of request to be before 5/1/13, 3 pm. TS 604 may mint a new root key k and construct an identifier ${\{k\}}_{TS}$ for it. The key and identifier may be used to construct a basic macaroon $M_0$ which may be extended with the aforesaid first-party caveats. The target service may then hand the constructed macaroon to the file system. The following illustrates example pseudocode that represents certain of the above-described steps:

$M_0$:=CreateMacaroon(k, ${\{k\}}_{TS}$)
$M_1$:=$M_0$. AddFirstPartyCaveat("block ∈{100 ... 500}")
$M_2$:=$M_1$. AddFirstPartyCaveatroperation c {read, write}")
$M_{TS}$:=$M_2$. AddFirstPartyCaveat("time <5/1/13, 3 pm")

The filesystem may then be handed $M_{TS}$, whose signature is $K_{FS}$.

Attenuating the Macaroon at the File System

In an embodiment, the file system may add one or more first-party caveats to a macaroon. For example, referring to FIG. 6, FS 602 may limit the block request parameter to 235, the operation request parameter to read, and time of request to until 5/1/13, 1am, which may be represented as follows:

$M_3$:=$M_{TS}$. AddFirstPartyCaveat("block=235")
$M_4$:=$M_3$. AddFirstPartyCaveat("operation=read")
$M_5$:=$M_4$. AddFirstPartyCaveatrtime <5/1/13, 1 am")

In an embodiment, the file system may add one or more third-party caveats. For example, the file system may add a third-party caveat that requires that a user authenticate as "Bob" at AS.com, which may be represented as follows:

FS→AS:cK, "user=Bob"
AS→FS:${\{(cK, \text{"user=Bob"})\}}_{AS}$

The file system may mint a new caveat root key, cK, and may send it to the authentication service AS along with a predicate user="Bob", that will be appropriately interpreted by AS. The authentication service may reply with an identifier for the key and predicate.

In an embodiment, instead of the above exchange, the file system itself may create the key identifier by encrypting the second message with a key $K_A$ it holds for AS. For such a key, and for all message exchanges, FS, AS, as well as clients, may be assumed to perform proper authentication, and appropriately establish confidentiality and integrity, using out-of-band mechanism like TLS.

The file system may use the root key cK and the key identifier for AS to add a third-party caveat to the macaroon $M_5$, such as the following:

$M_{FS}$:=$M_5$. AddThirdPartyCaveat (cK, ${\{(cK, \text{"user=Bob"})\}}_{AS}$, AS.com)

The user is then handed $M_{FS}$, whose signature is $K_{USER}$.

Acquiring Discharges from the Authentication Service

In an embodiment, a client device of a user may scan a macaroon for one or more third-party caveats, and may attempt to acquire a discharge for each third-party caveat. A client device may extract the identifier cId from one or more third-party caveats, $cav_{@L}$(cId, tId), and may send it to the third-party service at L. The third-party service may extract the root key and authorization predicate from the identifier cId, and may check if the predicate holds. Once it verifies that the predicate holds, the service may return to the user a caveat discharge macaroon that is minted using the extracted root key and has cId as its key identifier. To render the discharge macaroon immutable, the service may apply a one-way hash function, H, to its signature.

In an embodiment, the discharge macaroon $M_{AS}$ may in turn have first-party and third-party caveats added by the authentication service. The user may recursively obtain one or more discharge macaroons for each embedded third-party caveats until there are no outstanding third-party caveats in any of the discharge macaroons. $M_U$ may represent the set of all discharge macaroons obtained in this process.

Making an Access Request Using Macaroons

In an embodiment, a client device may bind all discharge macaroons in $M_U$ to the authorizing macaroon $M_{FS}$.sealed, which may be represented by the following:

$M_U^{sealed}$: =$M_{FS}$. PrepareForRequest($M_U$)

A client device may make an access request to the target service by sending it the request parameters, the authorizing macaroon $M_{FS}$ and the set of discharge macaroons. $M_U^{sealed}$ For instance, this process may be represented by the following with respect to FIG. 6:

U→TS: block=235, operation=read; $M_{FS}$; $M_U$

Handling the Request at the Target Service

In an embodiment, the target service may handle the access request. The target service may scan the provided macaroons for first-party caveats and may check the associated predicates in the context of the request. If any of the predicates are not true, the request may be denied. If the predicates are true, the target service may generate a set of all valid first-party caveat predicates, A, which may be passed with the request to the next stage.

In an embodiment, the target service may extract the root key k from the identifier of the macaroon $M_{FS}$, and may invoke $M_{FS}$.Verify($M_{FS}$, k, A, $M_{user}$) to check if $M_{FS}$ is fully discharged by the set of valid first-party predicates A and the set of discharge macaroons $M_U^{sealed}$. If the Verify function fails (i.e., an assertion fails), the request is may be denied. If the Verify function succeeds, the target service may perform the service according to the request parameters.

In an embodiment, the signature of a macaroon whose starting identifier id conveys the root key $K_0$ may be represented as HMAC(KDF($K_0$, [id, m1, ..., $m_{n-1}$]), $m_n$), where KDF is a key derivation function, defined by HMAC($K_0$, id) for the base case, or by using each successive HMAC output as the key to the next HMAC application for a list of messages.

In an embodiment, macaroons may embed caveats with different, more elaborate semantics, such as, for example, requiring approval from a third-party service for an authorized request. Thus, macaroons may be strictly more expressive than SPKI/SDSI, or other authorization credentials similarly based on long-lived public-key certificates.

In an embodiment, the key identifiers for macaroons and caveats may be constructed using service-specific means, as discussed above. For example, root keys, lists of predicates, or other secrets may be stored in a database at the service and identified by an index key. Such identifiers may be opaque and may allow revocation to be done by deleting a database row and/or the like. In an embodiment, keys may be encrypted. Shared, symmetric encryption keys may be used, known to and trusted by each principal pair. In an alternate embodiment, public-key encryption may be used, which may allow the same key to be used by several principals to create caveats for a single service that holds the private key.

In an embodiment, the root keys for caveats and caveat discharge macaroons may be shared across principals or services. As such, the root keys of all verified macaroons may become known to a target service for a request. Thus, such root keys should not be reused, unless necessary and it is done in a known-to-be secure fashion. In an embodiment, a strong caveat root may be chosen to dissuade malicious principals from creating false discharge macaroons by guessing the caveat root key. However, for some principals (e.g., frames in a browser, or embedded devices), no reliable source of entropy may be present that allow the creation of good random keys.

In an embodiment, caveat root keys may be derived from the signature of the embedding macaroon. For adding a caveat to a macaroon with signature sig, its bearer may use the key HMAC(sig, n) where n is an arbitrary nonce to generate a strong root key—because HMAC is a pseudo-random function. Such a key may be unique and may not be repeated across different caveats.

Macaroons may permit many optimizations, in both their primitives and applications. For example, a reduced number of operations may be used for chained-MACs, if caveats are combined as in FIG. 7. In an embodiment, applications and/or services may choose to omit certain information from caveat discharging macaroons. This may be for purposes of optimization, but also to protect privacy. For example, the predicates encoded in the id of third-party caveats may be encrypted or otherwise hidden. Thus, in FIG. 6, the assertion user=="bob" may be visible only to FS and AS, and hidden from TS.

In an embodiment, for nested third-party caveats, an inner, nested discharge macaroon may not be included in the discharge macaroon for the outer caveat. Thus, for example, if a third party caveat may restrict access to users within a certain age range, the caveat discharging service may add a caveat to require a third-party authority to assert the bearer's date of birth. Subsequently, the same discharging service may remove this birth-date assertion discharge when it issues a discharge macaroon and, thereby, protect the user's privacy.

As described above, third-party caveats may be used to implement decentralized authorization using holder-of-key proofs from authentication servers. However, third-party caveats may be discharged not just by networked servers, but by any isolated protection domain capable of holding secrets, such as, for example, a Web browser frame or extension, a mobile application, or a hardware token that is available locally to a user at a client.

The delegation of third-party caveat discharging to such local principals may improve both performance, such as, for example, by reducing network messages, as well as the precision of authorization policy enforcement. For example, a collection of unrelated Web services may use the same federated login system. If each service maintains separate sessions, despite a logout in one service, a user may remain, unknowingly, logged in and authorized in other services. However, using macaroons, each request on all sessions may derive a fresh caveat discharge from the third-party federated login service (e.g., via a hidden iframe that holds the caveat root key to derive discharge macaroons and is accessible from each service's Web page). Thus, the federated login service may hold the authoritative credentials, the user may need to only log out once, yet the services may remain decoupled.

In an embodiment, a macaroon may be revoked. Depending on the workload and desired authorization policies, target services may implement revocation via a database "whitelist" and/or "blacklist" of macaroons that are valid and/or invalid, via expiry times or epoch counters embedded in macaroons, via some combination of the above and/or the like.

In an embodiment, revocation may be performed by a third-party caveat to the same discharging service (e.g., a network time authority). As an optimization, and to avoid redundant discharging of such caveats, these caveats may use the same caveat identifier (and, hence, the same root key) for multiple macaroons borne by the same principal. Thus, for example, a Web browser may hold hundreds of macaroons for images at the same service. If the images all use the same third-party revocation-check caveat, a single discharge macaroon will permit the browser to access any image. In an embodiment, this single macaroon may be valid for only a short time.

In an embodiment, revocation may be required when a target service is updated. For example, the operation "delete" may be added to a target service that offers previously-immutable, read-only storage, and the existing macaroons for this target may not constrain the operations in requests. In this case, the service may implement a default-deny policy for the delete operation, authorizing its use only in future macaroons. As a more principled approach, targets may version aspects of their service, and embed first-party predicates in macaroons that constrain the authorized versions.

In an embodiment, a caveat predicate may make one or more assertions about the structure of its set of authorizing macaroons. Such a caveat may reference values in other macaroons. Such a structural caveat may be used to enforce a notion of well-formed transactions, such as, for example, by ensuring that a certain order of nested third-party discharges are present. Structural caveats may also name values in other caveats or discharge macaroons. For example, the BrowserID protocol behind Mozilla Persona requires that identity assertions, minted by a browser and verified by trusted servers, must verify only if they state the domain name of the relying party for which they are meant. When expressing BrowserID in terms of macaroons, this check can be enforced in the form of a structural caveat.

In an embodiment, structural caveats may also be used to make assertions about public-key signatures. For example, a service may mint a macaroon that requires bearers to prove possession of a certain private key. For this, the service can add a first-party structural caveat whose predicate states "the set of macaroons must contain a digitally signed message m, verifiable by the public key P." The bearer would then be required to add such a signed message to the context of each request to be authorized by this macaroon.

In an embodiment, when adding third-party caveats to a macaroon, it may be desirable to add a set of macaroons where only one needs to be discharged. An example use case may be to allow a client to choose which authentication provider to use. One way of achieving this may be to augment macaroons to also include a conjunction or disjunction operator at the beginning of a caveat list. The Verify function may accordingly conjunct or disjunct the proof obligations specified by the caveats. This may lead to a notion of caveats on a macaroon as a logical formula with both disjunction and conjunction.

In an embodiment, in addition to being a building block for new protocols, macaroons may be added to certain existing authorization mechanisms.

ChannelID may bind bearer tokens to a channel-specific public key. ChannelIDs may be well suited for use in first-party caveat predicates, where they can contextually confine the use of sent and received macaroons to specific principals. Mozilla's SSO protocol BrowserID may also provide implementation guidelines for checking that messages during different steps are constrained to the domain of the relying party. Both are expressed naturally using caveats and macaroons. For the latter, macaroons may also make the caveats explicit in the protocol itself, rather than relying on implementors to follow guidelines.

In an embodiment, BrowserID may describe a very explicit chain of trust between tokens, issued by holders of certain private keys. A relying party trusts an identity assertion because it is signed by the user's browser. The browser's key is vetted by an identity provider, which in turn is trusted by a root CA. Such bearer-held chains of trust are encoded naturally in the MAC tower of macaroons, and can be verified with lower overhead than using public-key methods.

In an embodiment, Bucket Policies for Amazon S3 storage implement a rich policy language for contextual authorization. Using macaroons, those same policies could be applied on a per-item basis, instead of per storage-container bucket, with nearly no effort.

Cookies are widely used for authorization bearer tokens, such as HTTP session identifiers. Macaroon-based cookies may ensure integrity, despite not maintaining state at the server, and, through the use of caveats, allow the cookies to be bound to specific, observable client context of the client, such as IP address, user agent strings, referrers, etc. Also, the use of macaroons may allow clients to insert caveats, for example, to protect the cookies from being stolen via an insecure HTTP communication channel. Even simple attenuation caveats of that form may offer clients significant protection, such as, for example, by limiting any cookies sent with a request to a single client IP address, and using a validity period of only a few seconds.

In particular, a client can insert a first-party caveat specifying its intended server's name—e.g., to protect itself in the event that a location field is tampered with—such that a correct server will reject any macaroon that was misdirected to a malicious server, stolen, and subsequently presented to the proper server. In an embodiment, cookies may also benefit from the delegation functionality of macaroons, such as, for example, to implement light-weight but precise checks for session activity.

In an embodiment, the OAuth 2.0 Authorization Framework may offer protocols for web services to allow its users to grant certain access to other services, referred to as relying parties. OAuth 2.0 relies on several kinds of tokens, most important of which are Access tokens that are short-lived tokens acting as capabilities to, for example, login sessions or API endpoints, and Refresh tokens that are long-lived tokens meant for relying parties to exchange for Access tokens. Tokens may be transferred between players of the protocols during one of several flows defined by the OAuth 2.0 RFC.

In an embodiment, OAuth tokens may be structured as macaroons thereby allowing caveats to be chained on to them. Such caveats may be used to either attenuate the authority granted by the token, or to explicitly specify and enforce the security guidelines that agents participating in OAuth flows are advised to follow.

As an example, consider the OAuth Implicit-Grant flow where an access token is handed to a client-side application by placing it in the fragment identifier of the application's URI. Since an attacker can easily replace a token in the fragment identifier with a token meant for another application, a "caveat" associated with this flow is that all received access tokens must be validated at the resource server by an application to ensure that they are indeed meant for it. This validation step may be mandated by simply having a third-party caveat for the token-validation endpoint on all issued access tokens. More generally, most security recommendations on tightly confining tokens to particular clients and limiting their validity, to prevent token theft, session swapping and impersonation attacks can be mandated by specifying them as caveats and chaining them on to the OAuth tokens, if they are macaroons.

OAuth 2.0 also suffers from a problem of a relationship jungle. Relying parties must have a pre-existing relation to the web service that they (or their user) want to use. For example, a website wishing to allow its users to log in with OAuth 2.0, must register itself as a client application with the identity provider. In practice, this limits the user's choice of identity providers, and requires the web service to maintain centralized state and the relying parties to keep and protect a number of client id tokens. There are several means by which macaroons can address these issues, such as by safely storing client ids and redirect URLs directly in the macaroon issued to relying parties, thus avoiding storing a central registry.

In an embodiment, many existing authorization systems are based on public-key certificates, including SPKI/SDSI, KeyNote trust management, and/or the like. Most of these systems are not decentralized, but instead require a central, global repository of certificates. Also, these systems make use of a certificate-chain discovery process that is carried out upon authorization requests, and this discovery process can be costly. Scalability of such authorization systems is further hampered by the need to distribute and keep timely certificate revocation lists.

Given the above, authorization based on public-key certificates may benefit from the patterns of macaroon construction, even if the public-key credentials make no direct use of macaroons. Already, some certificate-based authorization uses a pattern where principals delegate authority by chaining an existing certificate to a newly-minted public/private key pair—handed off to a new principal—such that the recipient holds the private key and the public key is certified to wield a part of the sender's authority.

By having each principal, recursively, apply the above pattern to all authorizations, public-key certificates can effect the same type of delegation, attenuation, and key distribution as macaroons. While increasing the number of communication steps between principals, following such a macaroon-based pattern may eliminate the need to maintain a global certificate repository, since each principal will individually manage the set of certificates relevant to it, with each certificate being unique.

Furthermore, by appropriately choosing the certificate validity times and the predicates in their assertions, other benefits of macaroons may be replicated. In particular, such a certificate-based construction may provide similar benefits as macaroons in preventing linkability and protecting privacy. Unfortunately, unlike the MAC in macaroons, the cryptographic primitives of public-key certificates can incur significant overhead, especially for the minting of new public/private key pairs essential to the above.

Figure 8:
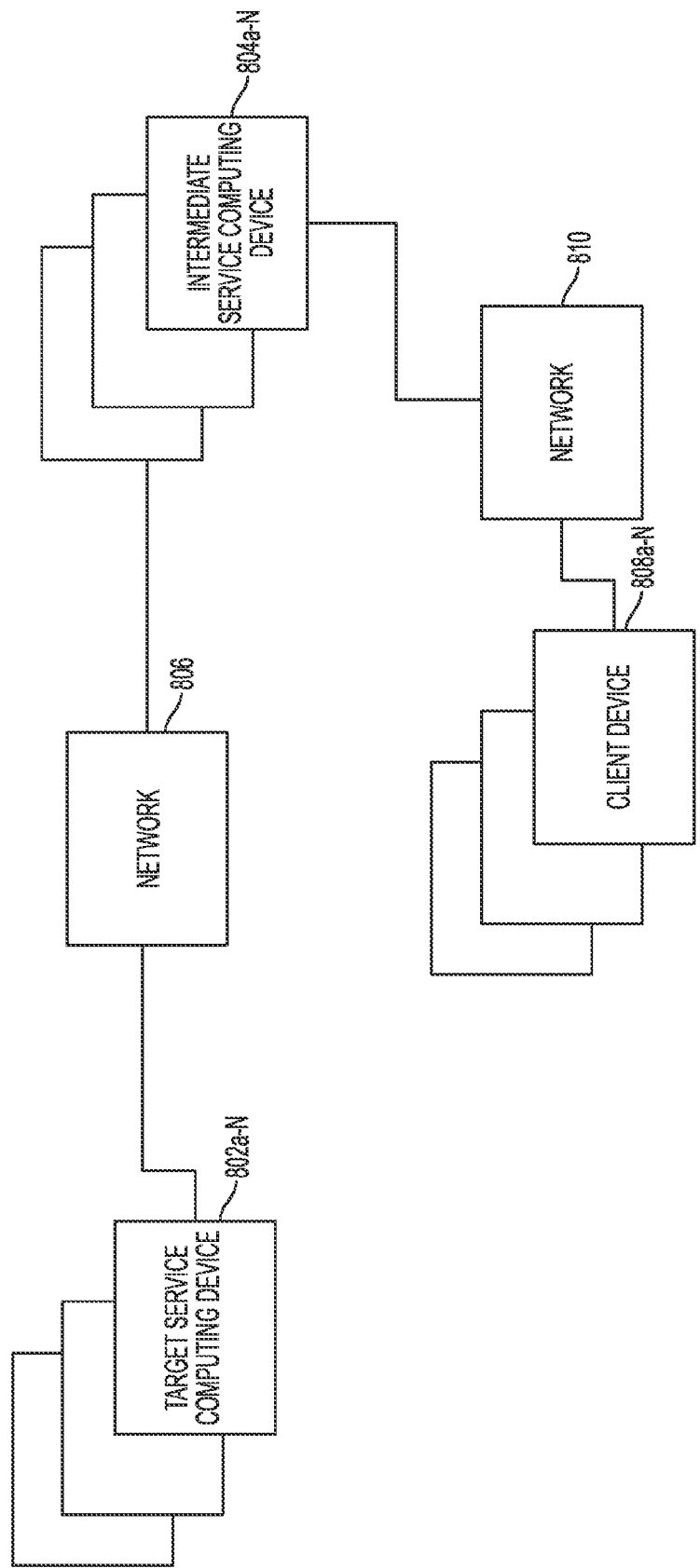
FIG. 8 illustrates an example system for minting and/or using an authentication credential according to an embodiment.

FIG. 8 illustrates an example system for minting and/or using a macaroon according to an embodiment. As shown in FIG. 8, a system 800 may include one or more target service computing devices 802a-N in communication with one or more intermediate service computing devices 804a-N over one or more communication networks 806. The system 800 may include one or more intermediate service computing devices 804a-N in communication with one or more client devices 808a-N over a communication network 810.

In an embodiment, a target service computing device 802a-N may be associated with a target service. For example, a target service computing device 802a-N may be used to mint and/or distribute a macaroon. In an embodiment, an intermediate service computing device 804a-N may be associated with a system that may receive a macaroon from a target service. Example target service computing devices and/or service computing devices may include, without limitation, servers, mainframes and/or the like.

In an embodiment, a client device may be associated with a user who may make an access request to a target service. Example client devices 808a-N may include, without limitation, laptop computers, desktop computers, portable computing devices, smartphones, tablet computers and/or the like.

In an embodiment, a communication network 806, 810 may be a local area network (LAN), a wide area network (WAN), a mobile or cellular communication network, an extranet, an intranet, the Internet and/or the like. In an embodiment, the communication network 806 may provide communication capability between one or more target service computing devices 802a-N and one or more intermediate service computing devices 804a-N. In an embodiment, the communication network 810 may provide communication capability between one or more target service computing devices 802a-N, one or more intermediate service computing devices 804a-N and/or one or more client devices 808a-N.

Figure 9:
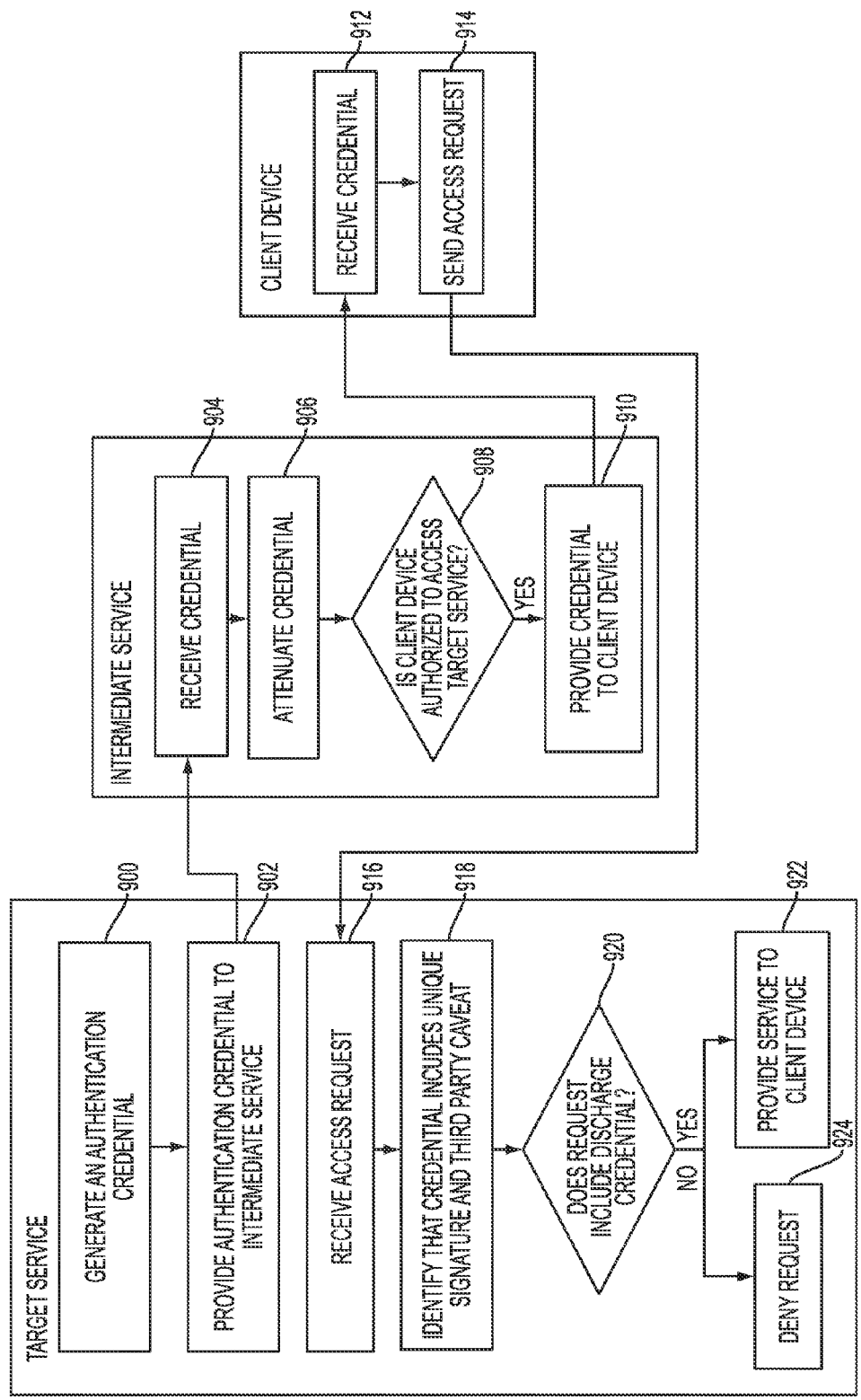
FIGS. 9 and 10 illustrate flow charts of example methods of controlling the sharing of data between entities that are in electronic communication with each other using one or more authentication credentials according to various embodiments.

FIG. 9 illustrates a flow chart of an example method of controlling the sharing of data between entities that are in electronic communication with each other using one or more authentication credentials, such as a macaroon, according to an embodiment. As illustrated by FIG. 9, a target service may generate 900 an authentication credential. The authentication credential may include an identifier for the target service and/or a unique signature. In an embodiment, the target service may provide 902 the authentication credential to an intermediate service. The intermediate service may receive 904 and attenuate 906 the authentication credential. The intermediate service may determine 908 whether a client device is authorized to access the target service. If the intermediate service determines 908 that the client device is authorized to access the target service, the intermediate service may provide 910 the authentication credential to the client. The client may receive 912 the authentication credential, and may send 914 an access request to the target service. In an embodiment, the target service may receive 916 an access request from the client device. The request may include the authentication credential and one or more parameters that relate to a requested service that is available from the target service. The target service may identify 918 that the authentication credential includes the unique signature and a third party caveat that is associated with a third party authentication service. In an embodiment, the target service may determine 920 whether the request also comprises a discharge credential for the third party caveat, and if the request includes the discharge credential, the target service may provide 922 the client device with the requested service. If the request does not include the discharge credential, the target service may deny 924 the request.

Figure 10:
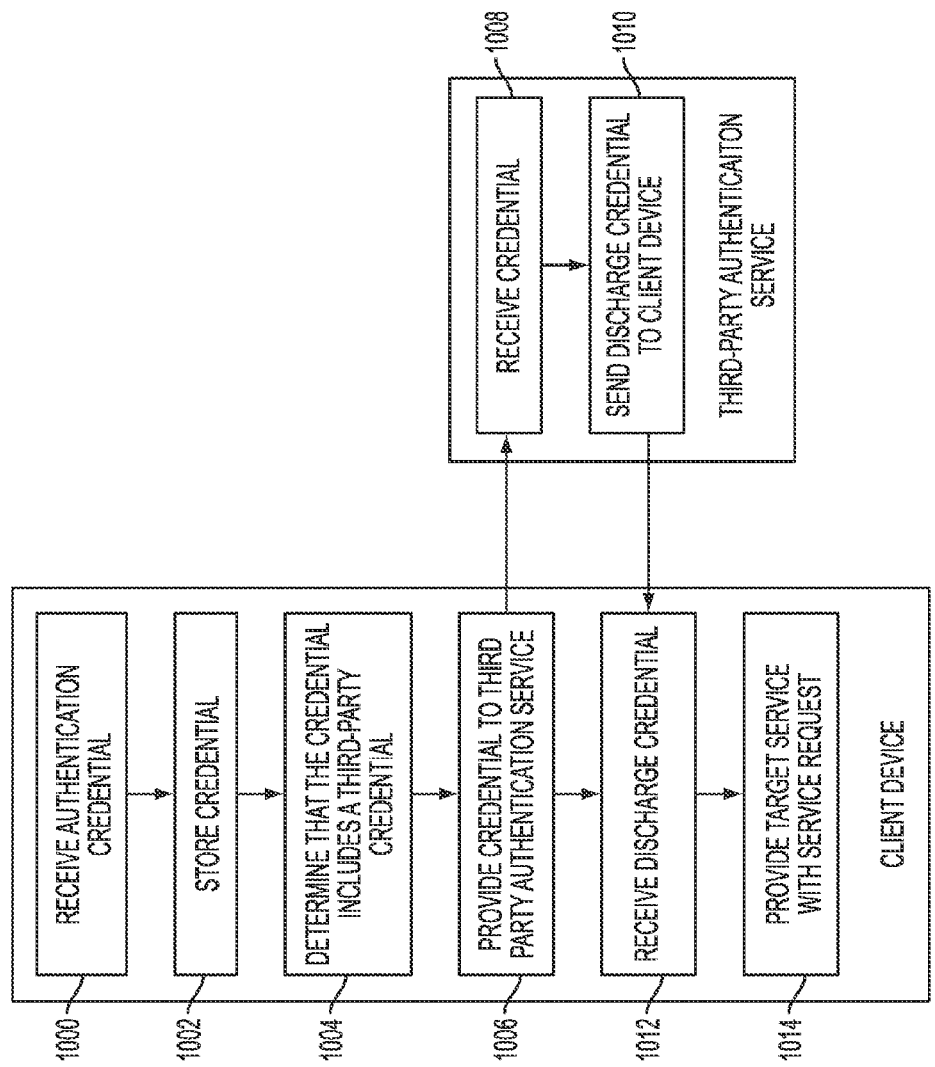

FIG. 10 illustrates a flow chart of an example method of controlling the sharing of data between entities that are in electronic communication with each other using one or more authentication credentials, such as a macaroon, according to an embodiment. As illustrated by FIG. 10, a client device may receive 1000 an authentication credential. The authentication credential may include an identifier for a target service and/or a caveat that is associated with a third party authentication service. The client device may store 1002 the authentication credential in a non-transitory, computer-readable memory. The client device may identify 1004 that the authentication credential includes the caveat, and may provide 1006 the authentication credential to the third party authentication service. The third party authentication service may receive 1008 the credential, and may send 1010 a discharge credential to the client device. The client device may receive 1012, from the third party authentication service, a discharge credential. After the client device has received the discharge credential, the client device may provide 1014 the target service with a service request. The service request may include the authentication credential and the discharge credential.

Figure 11:
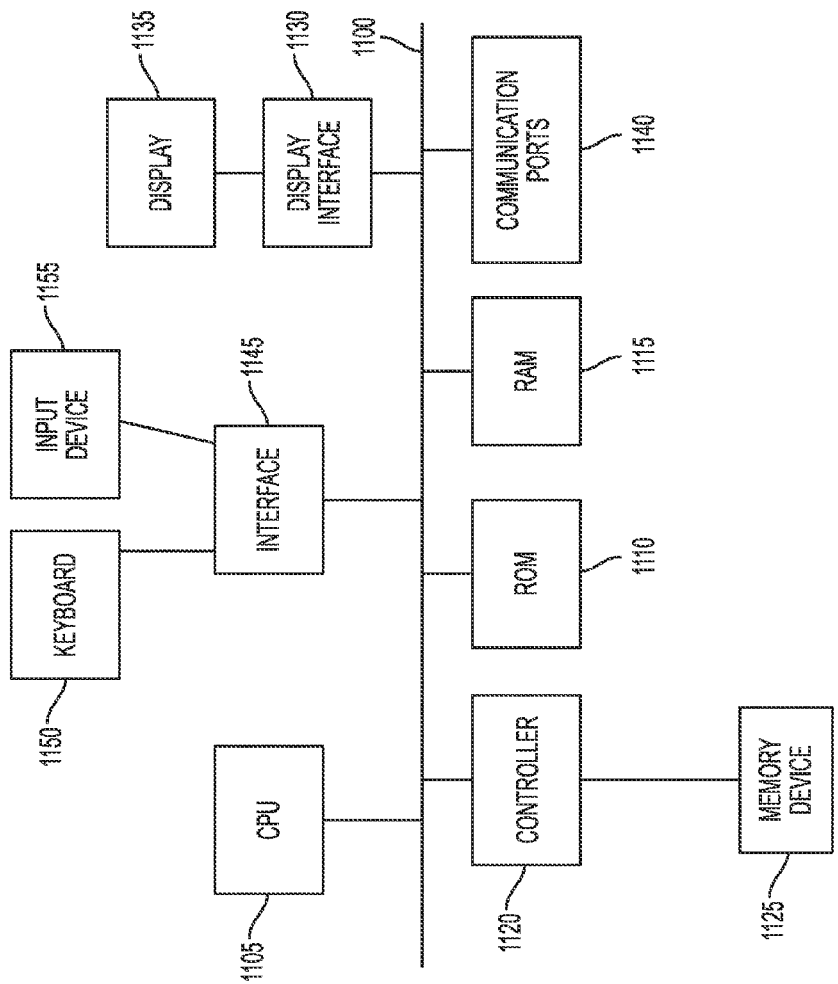
FIG. 11 illustrates a block diagram of example hardware that may be used to contain or implement program instructions according to an embodiment.

FIG. 11 depicts a block diagram of hardware that may be used to contain or implement program instructions. A bus 1100 serves as the main information highway interconnecting the other illustrated components of the hardware. CPU 1105 is the central processing unit of the system, performing calculations and logic operations required to execute a program. CPU 1105, alone or in conjunction with one or more of the other elements disclosed in FIG. 11, is an example of a production device, computing device or processor as such terms are used within this disclosure. Read only memory (ROM) 1110 and random access memory (RAM) 1115 constitute examples of non-transitory computer-readable storage media.

A controller 1120 interfaces with one or more optional non-transitory computer-readable storage media 1125 to the system bus 1100. These storage media 1125 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1110 and/or the RAM 1115. Optionally, the program instructions may be stored on a tangible non-transitory computer-readable medium such as a compact disk, a digital disk, flash memory, a memory card, a USB drive, an optical disc storage medium, such as a Blu-Ray™ disc, and/or other recording medium.

An optional display interface 1130 may permit information from the bus 1100 to be displayed on the display 1135 in audio, visual, graphic or alphanumeric format. Communication with external devices, such as a printing device, may occur using various communication ports 1140. A communication port 1140 may be attached to a communication network, such as the Internet or an intranet.

The hardware may also include an interface 1145 which allows for receipt of data from input devices such as a keyboard 1150 or other input device 1155 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of controlling the sharing of data between entities that are in electronic communication, comprising:
generating, by a cloud-based server of a target service, an authentication credential comprising:
an identifier for the target service, and
a unique signature representing a keyed-hash message authentication code generated using a key identifier and a secret key associated with the target service; and
by an intermediate service:
attenuating the authentication credential by placing one or more restrictions on a use of the authentication credential,
generating an updated unique signature for the authentication credential wherein the updated unique signature represents a keyed-hash message authentication code that is generated using the unique signature and the one or more restrictions,
replacing the unique signature of the authentication credential with the updated unique signature, and
providing the authentication credential to a client electronic device that is in electronic communication with the cloud-based server only when the client electronic device is authorized to access the target service;
by the cloud-based server of the target service:
receiving an access request from the client electronic device, wherein the request comprises the authentication credential and one or more parameters that relate to a requested service that is available from the target service,
identifying that the authentication credential includes the updated unique signature and a third party caveat that is associated with a third party authentication service,
in response to the identifying, determining whether the request also comprises a discharge credential for the third party caveat, and
in response to determining that the request includes the discharge credential:
identifying a signature for the discharge credential, and
determining whether the signature for the discharge credential corresponds to a signature for the third party authentication service, and
providing the client electronic device with the requested service only when the signature for the discharge credential corresponds to the signature for the third party authentication service, otherwise denying the request.

2. The method of claim 1, further comprising, by the cloud-based server:
identifying that the authentication credential also includes a first party caveat, wherein the first party caveat comprises a predicate;
determining whether a condition associated with the predicate is true; and
only providing the electronic client device with the requested service when the condition associated with the predicate is true, otherwise denying the request.

3. The method of claim 1, further comprising, by the electronic client device, identifying that the authentication credential includes the third party caveat, and in response:
extracting a caveat identifier from the third party caveat;
performing an action that is required by the third party caveat;
sending the caveat identifier and evidence of the action that is performed to the third party authentication service; and
receiving the discharge credential from the third party authentication service.

4. The method of claim 3, further comprising:
by the third party authentication service, returning an additional caveat with the discharge credential to the client;
by the cloud-based server:
identifying that the authentication credential includes the additional caveat,
determining whether the request also comprises an additional discharge credential for the additional caveat, and
only providing the client electronic device with the requested service when the target service has also received the additional discharge credential from the client, otherwise denying the request.

5. The method of claim 4, further comprising, by the client electronic device:
receiving the additional caveat from the third party authentication service;
extracting an additional identifier from the additional caveat;
performing an additional action that is required by the additional caveat;
sending the additional identifier and evidence of the performed additional action to an additional authentication service;
receiving the additional discharge credential from the additional authentication service; and
after receiving the additional discharge credential, providing the additional discharge credential to the target service with the request.

6. The method of claim 1, further comprising, by the cloud-based server:
determining whether the third party caveat is part of the discharge credential and whether the discharge credential is bound to the authentication credential; and
providing the client electronic device with the requested service only when the third party caveat is part of the discharge credential and the discharge credential is bound to the authentication credential, otherwise denying the request.

7. The method of claim 1, further comprising, by the cloud-based server:
determining whether the authentication credential or the discharge credential has expired;
and providing the client electronic device with the requested service only when neither the discharge credential nor the authentication credential has expired, otherwise denying the request.

8. The method of claim 1, wherein attenuating the authentication credential comprises adding one or more additional caveats to the authentication credential by the intermediate service.

9. The method of claim 8, wherein adding one or more additional caveats to the authentication credential comprises adding one or more of the following to the authentication credential:
one or more additional first-party caveats; and
one or more additional third-party caveats.

10. A method of controlling the sharing of data between entities that are in electronic communication, comprising:

generating, by a cloud-based server of a target service, a
   first authentication credential comprising:
   an identifier for the target service, and
   a unique signature representing a keyed-hash message
      authentication code generated using a key identifier
      and a secret key associated with the target service; and
by an intermediate service:
   attenuating the first authentication credential by placing
      one or more restrictions on a use of the first authentication credential,
   generating an updated unique signature for the first
      authentication credential wherein the updated unique
      signature represents a keyed-hash message authentication code that is generated using the unique signature and the one or more restrictions,
   replacing the unique signature of the first authentication
      credential with the updated unique signature, and
   providing the first authentication credential to a client
      electronic device in electronic communication with
      the cloud-based server only when the client electronic
      device is authorized to access the target service;
by the cloud-based server:
   receiving an access request from the client electronic
      device, wherein the request includes the first authentication credential, one or more parameters that relate
      to a requested service that is available from the target
      service, and a plurality of disjunctive authentication
      credentials,
   identifying that one or more of the first authentication
      credential and one or more of the plurality of disjunctive authentication credentials includes the updated
      unique signature and one or more third party caveats
      that are associated with one or more third party
      authentication services,
   in response to the identifying, determining whether the
      request also comprises one or more discharge credentials for the one or more third party caveats,
   in response to determining that the request includes the
      one or more discharge credentials for the one or more
      third party caveats:
      identifying a signature for a discharge credential from
         the one or more discharge credentials, and
      determining whether the signature for the discharge
         credential corresponds to a signature for a third
         party authentication service,
   providing the client electronic device with the requested
      service only when the signature for the discharge
      credential corresponds to the signature for the third
      party authentication service, otherwise denying the
      request.

11. The method of claim 10, further comprising, by the cloud-based server:
   identifying that the first authentication credential also
      includes a first party caveat, wherein the first party
      caveat comprises an identifier and a predicate;
   determining whether a condition associated with the predicate is true; and
   only providing the client electronic device with the
      requested service when the condition associated with the
      predicate is true, otherwise denying the request.

12. The method of claim 11, further comprising, by the client electronic device, identifying that the first authentication credential includes one or more of the third party caveats, and in response:
   extracting a caveat identifier from each of the third party
      caveats;
   performing an action that is required by each of the third
      party caveats;
   for each third party caveat, sending the caveat identifier for
      the third party caveat and evidence of the action that is
      performed to the third party authentication service that is
      associated with the third party caveat; and
   for each third party caveat, receiving the discharge credential for the third party caveat from the associated third
      party authentication service.

13. The method of claim 12, further comprising:
   by a first one of the one or more third party authentication
      services, returning an additional caveat with the discharge credential for one of the third party caveats to the
      client electronic device;
   by the cloud-based server:
      identifying that the first authentication credential
         includes the additional caveat,
      determining whether the access request also comprises
         an additional discharge credential for the additional
         caveat, and
      only providing the client electronic device with the
         requested service if the target service has also
         received the additional discharge credential from the
         client electronic device, otherwise denying the access
         request.

14. The method of claim 13, further comprising, by the client electronic device:
   receiving the additional caveat from the first one of the one
      or more third party authentication services;
   extracting an additional identifier from the additional
      caveat;
   performing an additional action that is required by the
      additional caveat;
   sending the additional identifier and evidence of the additional action that is performed to a second one of the
      third party authentication services;
   receiving the additional discharge credential from the second one of the third party authentication services; and
   after receiving the additional discharge credential, providing the additional discharge credential to the target service with the request.

15. The method of claim 10, further comprising, by the cloud-based server:
   determining whether the third party caveat is part of the
      discharge credential and whether the discharge credential is bound to the first authentication credential; and
   providing the client electronic device with the requested
      service only when the third party caveat is part of a
      discharge credential that is bound to the first authentication credential, otherwise denying the request.

16. The method of claim 10, wherein attenuating the first authentication credential comprises adding one or more additional caveats to the first authentication credential by the intermediate service.

17. The method of claim 16, wherein adding one or more additional caveats to the first authentication credential comprises adding one or more of the following to the first authentication credential:
   one or more additional first-party caveats; and
   one or more additional third-party caveats.

18. A method of controlling the sharing of data between entities that are in electronic communication, comprising:
   by an intermediate service:
      generating an updated unique signature for an authentication credential, wherein the updated unique signature represents a keyed-hash message authentication code that is generated using a unique signature and one or more restrictions on the authentication credential, and replacing the unique signature with the updated signature;

by a client electronic device:

receiving the authentication credential from the intermediate service, wherein the authentication credential comprises:

an identifier for a target service, and a caveat that is associated with a third party authentication service;

storing the authentication credential in a non-transitory, computer-readable memory;

identifying that the authentication credential includes the caveat;

providing the authentication credential to the third party authentication service;

receiving, from the third party authentication service, a discharge credential that confirms that the caveat has been satisfied;

identifying that the third party authentication service has returned a second caveat with the discharge credential;

sending, to an additional authentication service, evidence that a condition required by the second caveat has been satisfied;

receiving, from the additional authentication service, a second discharge credential;

providing the target service with a service request for a requested service, wherein the service request comprises the authentication credential, the discharge credential and the second discharge credential; and receiving the requested service from the target service.

19. The method of claim 18, further comprising:

by the client electronic device, identifying that the authentication credential includes a third party caveat, and in response:

performing an action that is required by the third party caveat;

sending a caveat identifier for the authentication credential and evidence of the performed action to the third party authentication service; and receiving the discharge credential from the third party authentication service.

20. The method of claim 18, further comprising, by the client electronic device:

performing a second action that is required by the second caveat;

sending evidence wherein the evidence comprises evidence that the second action has been performed.

21. The method of claim 20, further comprising, by the client electronic device, before sending the request to the target service, binding each of the discharge credential and the second discharge credential to the authentication credential.

22. The method of claim 20, wherein binding each of the discharge credential and the second discharge credential to the authentication credential comprises:

generating a common signature for each of the discharge credential and the second discharge credential and the authentication credential; and replacing the signatures for each of the discharge credential and the second discharge credential and the authentication credential with the common signature.

23. The method of claim 18, further comprising, by the client electronic device, identifying that the authentication credential also includes a first party caveat that is associated with the target service, and in response:

performing an action that is required by the first party caveat;

when sending the request to the target service, including evidence of the action being performed with the request.

24. The method of claim 18, wherein:

providing the authentication credential to the third party authentication service comprises providing the authentication credential to a service that is available to the client electronic device;

the discharge credential comprises a caveat that the discharge credential is only valid during a current user session of the client electronic device; and the client electronic device will only provide the target service with the service request comprising the authentication credential and the discharge credential when the current session is still active and the discharge credential is still valid.

25. A system for controlling the sharing of data between entities that are in electronic communication, the system comprising:

a cloud-based server associated with a target service and target service programming instructions that, when executed, cause the cloud-based server to generate an authentication credential comprising an identifier for the target service, and a unique signature representing a keyed-hash message authentication code generated using a key identifier and a secret key associated with the target service; and an intermediate service computing device and intermediate service programming instructions in communication with the target service computing device, wherein the intermediate service programming instructions, when executed, cause the intermediate service computing device to:

attenuate the authentication credential by placing one or more restrictions on a use of the authentication credential's use, generate an updated unique signature for the authentication credential wherein the updated unique signature represents a keyed-hash message authentication code that is generated using the unique signature and the one or more restrictions, replace the unique signature of the authentication credential with the updated unique signature, and provide the authentication credential to a client electronic device that is in electronic communication with the cloud-based server only when the client device is authorized to access the target service;

wherein the target service programming instructions, when executed, also cause the cloud-based server to:

receive an access request from the client electronic device, wherein the request comprises the authentication credential and one or more parameters that relate to a requested service that is available from the target service, identify that the authentication credential includes the updated unique signature and a third party caveat that is associated with a third party authentication service, in response to the identifying, determine whether the request also comprises a discharge credential for the third party caveat, and in response to determining that the request includes the discharge credential:

identify a signature for the discharge credential, and determine whether the signature for the discharge credential corresponds to a signature for the third party authentication service, and provide the client electronic device with the requested service only when the signature for the discharge credential corresponds to the signature for the third party authentication service, otherwise deny the request.

26. A system for controlling the sharing of data between entities that are in electronic communication, the system comprising:
   a cloud-based server and target service programming instructions that, when executed, cause the cloud-based server to generate a first authentication credential comprising an identifier for the target service, and a unique signature representing a keyed-hash message authentication code generated using a key identifier and a secret key associated with the target service; and
   an intermediate service computing device and intermediate service programming instructions that, when executed, cause the intermediate service computing device to:
      attenuate the first authentication credential by placing one or more restrictions on a use of the first authentication credential,
      generate an updated unique signature for the first authentication credential wherein the updated unique signature represents a keyed-hash message authentication code that is generated using the unique signature and the one or more restrictions,
      replace the unique signature of the first authentication credential with the updated unique signature, and
      provide the first authentication credential to a client electronic device in electronic communication with the cloud-based server only when the client device is authorized to access the target service;
   wherein the target service programming instructions, when executed, also cause the cloud-based server to:
      receive an access request from the client electronic device, wherein the request includes the first authentication credential, one or more parameters that relate to a requested service that is available from the target service, and a plurality of disjunctive authentication credentials,
      identify that one or more of the received credentials includes the updated unique signature and a third party caveat that is associated with a third party authentication service,
      in response to the identifying, determine whether the request also comprises a discharge credential for at least one of the third party caveats, and
      in response to determining that the request includes [a] the discharge credential for at least one of the third party caveats:
         identify a signature for the discharge credential, and
         determine whether the signature for the discharge credential corresponds to a signature for the third party authentication service, and
         provide the client electronic device with the requested service only when the signature for the discharge credential corresponds to the signature for the third party authentication service, otherwise deny the request.

27. A system for controlling the sharing of data between entities that are in electronic communication, the system comprising:
   a computing device in electronic communication with a cloud-based server of a target service and an intermediate service computing device;
   a first non-transitory computer readable storage medium in communication with the intermediate service computing device, wherein the first non-transitory computer readable storage medium comprises one or more programming instructions that, when executed, cause the intermediate service computing device to:
      generate an updated unique signature for an authentication credential, wherein the updated unique signature represents a keyed-hash message authentication code that is generated using a unique signature and one or more restrictions on the authentication credential, and
      replace the unique signature with the updated unique signature,
   a second non-transitory, computer-readable storage medium in communication with the computing device, wherein the second computer-readable storage medium comprises one or more programming instructions that, when executed, cause the computing device to:
      receive the authentication credential from the intermediate service computing device, wherein the authentication credential comprises:
         an identifier for the target service, and
         a caveat that is associated with a third party authentication service, store the authentication credential in the second non-transitory, computer-readable storage medium,
      identify that the authentication credential includes the caveat,
      provide the authentication credential to the third party authentication service,
      receive, from the third party authentication service, a discharge credential that confirms that the caveat has been satisfied,
      identify that the third party authentication service has returned a second caveat with the discharge credential,
      send, to an additional authentication service, evidence that a condition required by the second caveat has been satisfied,
      receive, from the additional authentication service, a second discharge credential,
      provide the cloud-based server with a service request for a requested service, wherein the service request comprises the authentication credential, the discharge credential, and the second discharge credential, and
      receive the requested service from the target service.

* * * * *